(12) United States Patent
Zuber et al.

(10) Patent No.: US 8,361,674 B2
(45) Date of Patent: Jan. 29, 2013

(54) MULTI-LAYER MEMBRANE-ELECTRODE-ASSEMBLY (ML-MEA) AND METHOD FOR ITS MANUFACTURE

(75) Inventors: Ralf Zuber, Groβ-Umstadt (DE); Knut Fehl, Schlüchtern-Ramholz (DE); Peter Seipel, Alzenau (DE); Sven Bornbaum, Staufenberg (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 1003 days.

(21) Appl. No.: 11/578,316

(22) PCT Filed: Apr. 12, 2005

(86) PCT No.: PCT/EP2005/003874
§ 371 (c)(1),
(2), (4) Date: May 7, 2007

(87) PCT Pub. No.: WO2005/101554
PCT Pub. Date: Oct. 27, 2005

(65) Prior Publication Data
US 2007/0231689 A1    Oct. 4, 2007

(30) Foreign Application Priority Data
Apr. 13, 2004 (DE) .................. 040 08 713

(51) Int. Cl.
*H01M 8/02* (2006.01)
*H01M 8/10* (2006.01)
(52) U.S. Cl. ........................ 429/510; 429/483
(58) Field of Classification Search .............. None
See application file for complete search history.

(56) References Cited

U.S. PATENT DOCUMENTS 6,475,656 B1 * 11/2002 Koschany et al. ............ 429/483
6,533,827 B1   3/2003 Cisar et al.
(Continued)

FOREIGN PATENT DOCUMENTS

EP    933 826 A1    8/1999
JP    05-242897     9/1993
(Continued)

OTHER PUBLICATIONS

EP 1 095 415 Derwent Record, May 5, 2003, Manhattan Scientifics.
(Continued)

*Primary Examiner* — Jonathan Crepeau
(74) *Attorney, Agent, or Firm* — Levin Santalone LLP; John Santalone

(57) ABSTRACT

The invention relates to the field of electrochemical cells and fuel cells, more specifically to polymer-electrolyte-membrane fuel cells (PEMFC) and direct methanol fuel cells (DMFC). A multi-layer membrane-electrode-assembly (ML-MEA) comprising two electrically conductive bipolar plates and a membrane-electrode-assembly (MEA) bonded together by means of an electrically insulating adhesive material is disclosed. The adhesive material, preferably a polyurethane-based system, is in direct contact with the protective film layers attached to front side and the back side of the MEA, thus contamination of the ionomer membrane and/or the electrode layers with adhesive components is avoided. Multi-layer MEAs with improved long term stability and life time are obtained. The products are used for the manufacture of low temperature PEMFC and DMFC stacks.

10 Claims, 3 Drawing Sheets

U.S. PATENT DOCUMENTS

| | | | |
|---|---|---|---|
| 6,716,550 B1 * | 4/2004 | Kirby | 429/509 |
| 6,783,883 B1 | 8/2004 | Koschany | |
| 2003/0091885 A1 * | 5/2003 | Kobayashi et al. | 429/32 |
| 2003/0104264 A1 | 6/2003 | Shiepe et al. | |
| 2004/0067407 A1 | 4/2004 | Sompalli et al. | |
| 2004/0161655 A1 * | 8/2004 | Murphy et al. | 429/36 |

FOREIGN PATENT DOCUMENTS

| | | |
|---|---|---|
| JP | 10-055813 | 2/1998 |
| JP | 11-154522 | 6/1999 |
| JP | 11-219714 | 8/1999 |
| JP | 2000-323159 | 11/2000 |
| JP | 2002-361153 | 12/2002 |
| WO | WO 00/10216 A | 2/2000 |

OTHER PUBLICATIONS

International Search Report for PCT/EP2005/003874 dated Feb. 9, 2005.

Written Opinion for PCT/EP2005/003874, dated Feb. 9, 2005.

* cited by examiner

MULTI-LAYER MEMBRANE-ELECTRODE-ASSEMBLY (ML-MEA) AND METHOD FOR ITS MANUFACTURE

BACKROUND OF THE INVENTION

The invention relates to the field of electrochemical cells and fuel cells, more specifically to polymer-electrolyte-membrane fuel cells (PEMFC) and direct methanol fuel cells (DMFC) and describes a multi-layer membrane-electrode-assembly ("ML-MEA") comprising an ionomer membrane, an anode and cathode catalyst layer, one or more gas diffusion layers ("GDLs"), one or more protective film layers, one or more bipolar plates and one or more adhesive layer. The multi-layer MEA described herein typically comprises of seven to nine layers and is used as stack component for low temperature fuel cells. Furthermore, the invention is directed to a process for manufacture of the products.

Fuel cells convert a fuel and an oxidising agent into electricity, heat and water at two spatially separated electrodes. Hydrogen or a hydrogen-rich gas can be used as the fuel and oxygen or air as the oxidising agent. The energy conversion process in the fuel cell is distinguished by particularly high efficiency. For this reason, fuel cells are gaining increasing importance for mobile, stationary and portable applications.

The polymer electrolyte membrane fuel cell (PEMFC) and the direct methanol fuel cell (DMFC, a different type of the PEMFC which is powered directly by methanol instead of hydrogen) are suitable for use as energy converting devices due to their compact design, their power density and high efficiency. The technology of fuel cells is broadly described in the literature, ref to for example K. Kordesch and G. Simader, "Fuel Cells and its Applications", VCH Verlag Chemie, Weinheim (Germany), 1996.

In the following section, the technical terms used in the present patent application are described in greater detail:

The multi-layer MEA ("ML-MEA") disclosed in this patent application comprises of an ionomer membrane, two electrode layers, one or more protective film layers, one or more gas diffusion layers, one or more bipolar plates (herein also referred to as "separator plate") and finally, an electrically insulating adhesive material for bonding the components together. Typically, the multi-layer MEA (ML-MEA) comprises of a ionomer membrane, two electrode layers (an anode catalyst layer and a cathode catalyst layer), two protective film layers, two gas diffusion layers, two bipolar plates and adhesive material for bonding the components together. For the sake of clarity, the adhesive material used to bond the components together is not counted as an individual, separate layer in this application.

In a first embodiment of the present invention, the multi-layer MEA (ML-MEA) comprises of a catalyst-coated membrane ("CCM"), two protective film layers, two gas diffusion layers and two bipolar plates. An electrically insulating adhesive material is used for bonding the components together.

In a second embodiment, the multi-layer MEA (ML-MEA) comprises of a ionomer membrane, a gas diffusion layer carrying the anode catalyst layer (a catalyst-coated backing, "CCB"-anode), a gas diffusion layer carrying the cathode catalyst layer (a catalyst-coated backing; "CCB"-cathode) two protective film layers and two bipolar plates. An electrically insulating adhesive material is used for bonding the components together.

In the embodiments described above, the multi-layer MEA is referred to as a "9-layer"-MEA. However, 7-layer and 8-layer MEAs can be manufactured accordingly and are enclosed in the present application.

A catalyst-coated membrane ("CCM") consists of a polymer electrolyte membrane which is provided on both sides with a catalytically active electrode layer. One of the layers takes the form of an anode for the oxidation of hydrogen and the second layer takes the form of a cathode for the reduction of oxygen. As the CCM consists of three layers (anode catalyst layer, ionomer membrane and cathode catalyst layer), it is often referred to as "3-layer MEA".

Gas diffusion layers ("GDLs"), sometimes referred to as gas diffusion substrates or backings, are placed onto the anode and cathode layers of the CCM in order to bring the gaseous reaction media (hydrogen and air) to the electrode layers and, at the same time, to establish an electrical contact. GDLs usually consist of carbon-based substrates, such as carbon fiber paper or woven carbon fabric, which are highly porous and allow the reaction gases a good access to the electrodes. Furthermore, they are hydrophobic in order to remove the product water from the fuel cell.

GDLs can be coated with a microlayer to improve the contact to the membrane. They can be tailored specifically into anode-type GDLs or cathode-type GDLs, depending on which side they are built into a MEA. Furthermore, they can be coated with a catalyst layer and subsequently lamminated to the ionomer membrane. These catalyst-coated GDLs are frequently referred to as "catalyst-coated backings" (abbreviated "CCBs"). Catalyst coated-backings ("CCBs") are used in the second embodiment of the present invention (ref to above).

Suitable base materials for GDLs are woven carbon cloth, non-woven carbon fiber layers or carbon fiber papers. Typical GDL base materials are Toray TGP-H-060, SGL Sigracet Materials, or Textron AvCarb 1071 HCB by Textron Inc. The gas distribution layers may be hydrophobically treated or not. They may comprise additional carbon black microlayers and catalyst layers, if necessary.

The protective film layers are applied as frames on both sides of the ionomer membrane. However, other patterns and dimensions are possible. The protective film layers may be punched or perforated as needed for certain bipolar plate and PEM stack architectures. Preferred materials for protective film layers are organic thermoplastic, elastomeric or duroplastic polymers.

Bipolar plates ("separator plates") are used in PEM fuel cell stacks to separate adjacent cells and, simultaneously, to manage the flow of the reactant gases to the cell units. Bipolar plates are typically made from non-metallic conductors such as graphite, graphitized carbon, graphite composites, metals or metal composite materials. Usually, solid sheets of material are used, but alternatively, the carbonaceous precursor material can be formed by injection molding and converted to the conductive carbon form. Bipolar plates can also be made from a variety of metals or metal composit materials, such as titanium and stainless steel.

The electrode layers comprise of electrocatalysts, which catalyse the respective reaction (oxidation of hydrogen at the anode and reduction of oxygen at the cathode). The metals of the platinum group of the periodic table are preferably used as the catalytically active components. For the most part, supported catalysts are used, in which the catalytically active platinum group metals have been fixed in nano-sized particle form to the surface of a conductive support material. The average particle size of the platinum group metal is between about 1 and 10 nm. Carbon blacks with particle sizes of 10 to 100 nm and high electrical conductivity have proven to be suitable as support materials.

The polymer electrolyte membrane consists of proton-conducting polymer materials. These materials are herein also referred to as "ionomer membranes". Tetrafluoroethylene-fluorovinyl-ether copolymer with sulfonic acid groups is preferably used. This material is marketed for example by E.I. DuPont under the trade name Nafion®. However, other, particularly fluorine-free, ionomer materials such as sulfonated polyether ketones or aryl ketones or acid-doped polybenzimidazoles may also be used. Suitable ionomer materials are described by O. Savadogo in "Journal of New Materials for Electrochemical Systems" I, 47-66 (1998). For application in fuel cells, these membranes generally have a thickness between 10 and 200 microns.

Sealing of components is an important issue in fuel cell stack technology. In the manufacture of a PEMFC stack, several membrane-electrode-assemblies and bipolar plates are stacked in series to obtain the desired voltage output. Generally, it is necessary to achieve a gas-tight sealing of these components (CCMS, MEAs and bipolar plates) against leakage to the environment and against intermixing of the reactants (hydrogen and oxygen/air). This gas-tight seal is essential for the safety of a PEMFC stack. Thus the quality and endurance of the seals and the materials used for it are of primary importance. The sealing of the MEA components after stack assembly is costly and time consuming. In the present invention, the sealing is performed on the level of the individual MEA components, thus greatly reducing the complexity of the stack assembly processes.

In the current state of the art, it is known to combine bipolar plates with membrane-electrode assemblies prior to stack assembly.

EP 1 095 415 discloses a MEA/bipolar plate unit, in which the bipolar plate is directly attached to the ionomer membrane of the MEA by means of an adhesive. The adhesive material is in direct contact with the surface of the ionomer membrane and thus can contaminate the membrane material with reactive adhesive components. As a result, a poor long-term stability and stack lifetime may result.

A PEMFC construction with adhesively bonded layers is described in U.S. Pat. No. 6,495,278. The adhesive materials are in direct contact with the ionomer membrane and/or electrodes. Again, adhesive components can contaminate the membrane and catalyst materials, which could result in a poor durabilty and lifetime of the stack.

U.S. Pat. No. 6,533,827 discloses a bonding process for electrochemical cell components. The bonding can be accomplished by polymeric (i.e. adhesive) bonds or by metallurgical bonds. No details are given on the long term stability and durability of the adhesive bonds in PEMFC stacks. Polyurethane adhesives are reported to fail on titanium (Ti) metal surfaces when wet.

EP 933 826 A1 discloses a PEM fuel cell comprising a MEA and gaskets stacked between separator plates. The gaskets comprise of an elastomer layer and an adhesive layer. The elastomer layer is adhered to at least one separator plate via the adhesive layer. There is no adhesion between the elastomer layer and the outer peripheral rim of the ionomer membrane. Therefore, stacking and assembly of the cells is still complicated.

It was the objective of the present invention to solve the problems of the current state of the art and to provide MEA sub-assemblies (multi-layer MEAs, ML-MEAs), with excellent long-term stability. A direct contact of adhesive material with the ionomer membrane and/or the electrode layers should be avoided. Furthermore, the MEAs and multi-layer MEAs should be assembled into PEM-stacks by use of simple, low cost processes. Maintenance of the PEM stack should be facilitated, since a single MEA unit could be easily replaced in case of defects.

SUMMARY OF THE INVENTION

The multi-layer membrane-electrode-assembly ("ML-MEA") described in this patent application comprises of an ionomer membrane, two electrode layers, one or more protective film layers, one or more gas diffusion layers, one or more bipolar plates and finally, a gas-tight, electrically insulating adhesive material for connecting the components together. Typically, the multi-layer MEA (ML-MEA) comprises of an ionomer membrane, two electrode layers (an anode and a cathode catalyst layer), two protective film layers, two gas diffusion layers, two bipolar plates and adhesive material for bonding the layered materials together.

In the first embodiment ("CCM-technology"), the multi-layer MEA (ML-MEA) comprises of a catalyst-coated membrane ("CCM"), two protective film layers, two gas diffusion layers and two bipolar plates. An electrically insulating adhesive material is used for bonding the components together.

In the second embodiment ("CCB-technology"), the multi-layer MEA (ML-MEA) comprises of an ionomer membrane, a gas diffusion layer carrying the anode catalyst layer (catalyst-coated backing, "CCB"-anode), a gas diffusion layer carrying the cathode catalyst layer (catalyst-coated backing; "CCB"-cathode), two protective film layers and two bipolar plates. An electrically insulating adhesive material is used for bonding the components together.

However, combinations of these embodiments (for example a mixed CCM/CCB-technology) are possible and are within the scope of the present invention.

DETAILED DESCRIPTION OF THE PREFERRED EMBODIMENTS

Figure 1:
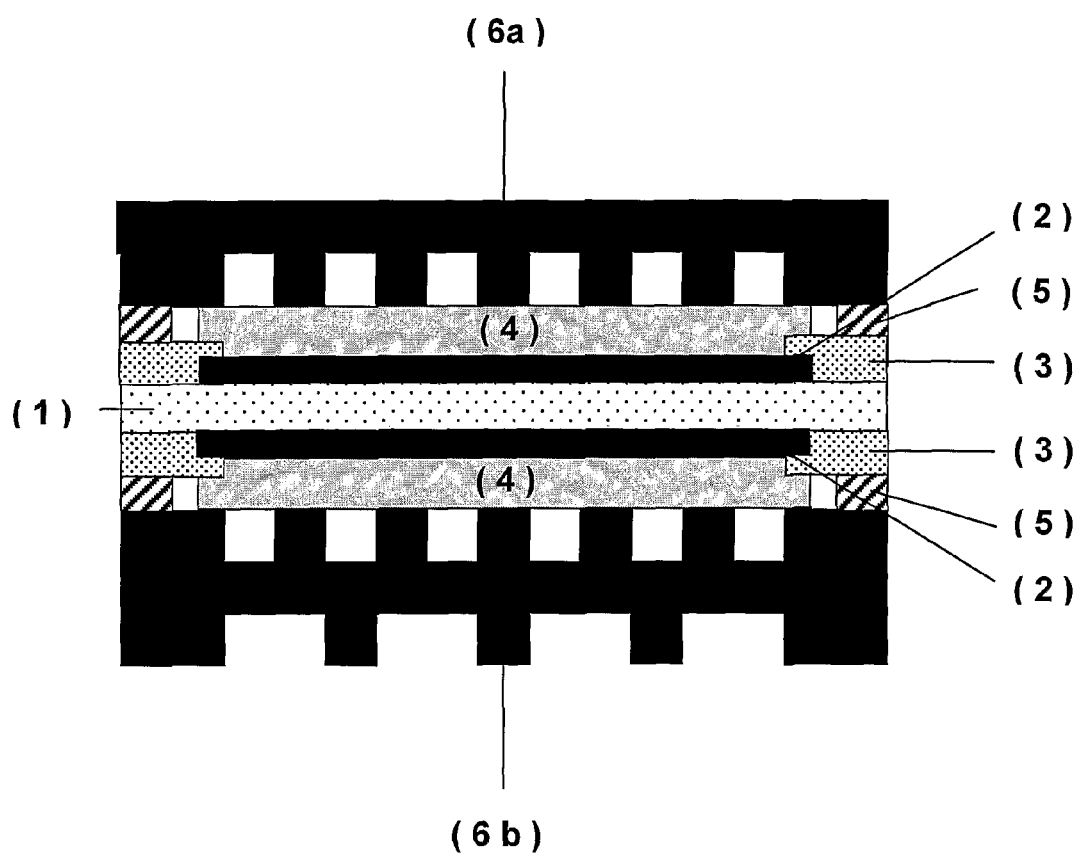
FIG. 1 a cross-section of the first embodiment of the invention

In the present invention, the sealing is performed on the level of the individual MEA components. The multi-layer MEA (ML-MEAs) described herein typically comprises of a 7-layer MEA with at least one bipolar plate attached to one side of the MEA. Prefereably, the ML-MEA comprises of a 9-layer MEA with two bipolar plates attached on either side of the MEA. However, 7-layer and 8-layer MEAs can be manufactured accordingly and are enclosed in the present application. For assembly of PEM or DMFC stacks, a variety of ML-MEAs are stacked together, assembled, and electrically connected in series for higher cell voltage. The methods and processes for stack assembly are well know to the person skilled in the art.

The protective film layer embraced in the CCM or in the MEA on both sides of the membrane can have various functions, depending on the various embodiments of the invention.

In the first embodiment (CCM-teclinology), the protective film overlaps with the active area (i.e. catalyst and electrode area) in a certain region and, at the same time it overlaps with a significant region of the passive, non-coated area (i.e.

peripheral rim) of the CCM. The region of the active area overlapped by the protective film layer is in the range of 0.5 to 20% of the total active area, preferably in the range of 3 to 10%.

In the second embodiment (CCB-technology), the protective film overlaps with a significant region of the passive, non-coated area (i.e. peripheral rim) of the ionomer membrane. Depending on the dimensions used, the protective film may or may not penetrate or overlap with the electrode layer. The region of the electrode layer penetrated or overlapped by the protective film layer is in the range of 0 to 20%, preferably in the range of 0 to 10% of the total active area.

Generally, one or more film layers can be applied on the front and/or on the back surface of the catalyst-coated membrane. During lamination, the protective film softens and firmly bonds to the ionomer membrane and the catalyst layer. The protective film layers are applied as frames on both sides of the ionomer membrane. However, other patterns and dimensions are possible. The layers may be punched or perforated as needed for certain bipolar plate and PEM stack architectures.

In the ML-MEA of the present invention, the adhesive material is in direct contact with the protective film layer. Thus, the protective film layer acts as a barrier layer to prevent the migration and leaching of residual adhesive components (for example hardener components, trace contaminants, residual volatile solvents, inorganic materials etc) into the ionoiner membrane and finally into the fuel cell stack. Contamination of the ionomer membrane material is prevented. Furthermore, as in the first embodiment, the protective film layer also overlaps with the active electrode layer (as outlined above, the region of the active area overlapped by the protective film layer is in the range of 0.5 to 20%), contamination of the active electrode layers by leached adhesive components is also prevented.

It was found by the present inventors that these unique designs result in an improved long term stability of the claimed ML-MEA and finally of the PEM-stack.

Suitable materials for use as protective film layers are organic thermoplastic, eleastomeric or duroplastic polymers such as polytetrafluoroethylene, PVDF (polyvinyldifluoride), polyethylene, polypropylene, polyester, polyamide, co-polyamide, polyamide elastomers, polyimide, polyurethane, polyurethane elastomers, silicones, silicon rubbers, silicon based elastomers and the like. Preferably, polyamide, polyurethane and polyurethan elastomers are employed, which are resistant to salts, ionic contaminants, water and organic molecules. Thus, the protective film layers can act as barrier layers to prevent contamination.

Suitable materials for use as adhesives are organic polymer adhesives selected from the classes of epoxides, silicones, polyurethanes, acrylic resins, isocyanates, phenolic resins, polyamide resins, polyester resins and the like. Copolymerisates of the individual resins as well as mixtures of the adhesive classes listed above can also be used. A suitable adhesive material should be electrically insulating and should provide a gastight seal between the components after curing. Single component and two component systems can be used. Preferably the adhesive is employed in a consistency and viscosity tailored for the specific application technology.

Adhesive application can be conducted by screen printing, pressure dispenser, stamping, dipping, stencil printing, doctor-blading or by similar processes. The pot life of two component adhesive systems should be in the range of 15 to 30 mins (minimum) at room temperature. The adhesive material can be applied either to the bipolar plates or to the protective film layers. However, variations are possible in which the adhesive material can also be applied to both components simultaneously or sequentially. A two-stage application process is possible.

After application, the curing/hardening of the adhesive is conducted by applying pressure and/or heat. Typical curing conditions are 24 to 72 hours at room temperature (23° C.). Elevated curing temperatures (up to 100° C.) can be used to reduce the curing times to 5 to 10 minutes. In order to control the adhesive gap and the adhesive layer thickness at a constant value of about 100 to 500 microns, two angular pieces of a PTFE foil (thickness 100 to 500 microns) are inserted in the edge areas of the bipolar plates prior to the hardening of the ML-MEA. After the curing step, these pieces are removed from the adhesive gap.

Alternatively, the adhesive application can be conducted in a two-stage adhesive appplication and curing process. In the first stage, a certain amount of adhesive is applied and pre-cured to generate hardened deposits with a fixed layer thickness. In the second step, additional wet adhesive is added and the ML-MEA is assembled under pressure while maintaining a constant adhesive layer thickness. In this modified process, no angular pieces of PTFE foil are necessary for layer thickness control.

The first embodiment of the present invention is demonstrated in FIG. 1. It depicts a cross-section of a multi-layer membrane electrode assembly (ML-MEA) consisting of nine layers. A 7-layer MEA with protective film layers as described in EP patent application EP 1 403 949 A1 is used as starting product, The ionomer membrane (1) is coated with electrode layers (2) on both sides thus forming a "CCM". A frame of protective film layer (3) is attached on either side to the passive area of the membrane (1) in such a way that the film layers overlap with the electrode layers in a small region and simultaneously form a peripheral rim around the active area. The surfaces of this assembly are then covered by two gas diffusion layers (4). Thus, a 7-layer MEA comprising the components (1)-(4) is obtained. Two bipolar plates (6a, 6b) are bonded to either side of the MEA by use of a gas-tight, electrically insulating adhesive material (5). The adhesive is in direct contact with a surface portion of the bipolar plate and with a surface portion of the protective film layer. As can be seen, the adhesive (5) is not in contact with the ionomer membrane (1) and the electrode layers (2). Contamination of the catalytically active electrodes and the ionomer membrane by adhesive components is avoided.

Figure 2:
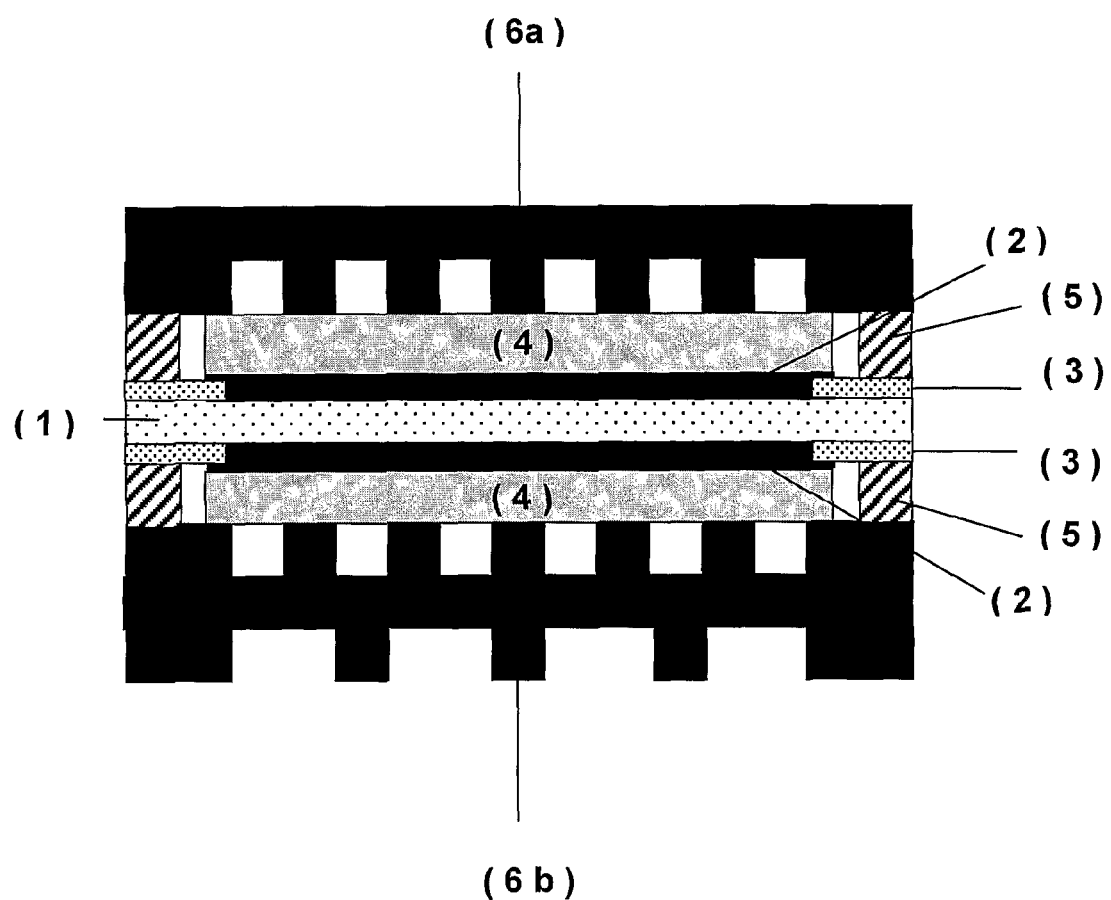
FIG. 2 a cross-section of the second embodiment of the invention

FIG. 2 demonstrates the second embodiment of the invention and depicts a cross-section of a multi-layer membrane electrode assembly (ML-MEA) consisting of nine layers and manufactured according to the "CCB-technology". A frame of protective film layer (3) is attached on either side to the passive area of a membrane (1). Then, two gas diffusion layers (4), each of which comprise electrode layers (2) on the side facing to the membrane are hot-pressed onto the membrane (1) comprising the attached protective film layers (3). Hot-pressing is performed in such a way that the protective film layers (3) overlap with the electrode layers and penetrate the electrode layers in a small area. Simultaneously, they form a peripheral rim around the active area. Thus, a 7-layer MEA comprising the components (1)-(4) is obtained. Two bipolar plates (6a, 6b) are bonded to either side of the MEA by use of a gas-tight, electrically insulating adhesive material (5). The adhesive is in direct contact with a surface portion of the bipolar plate and with a surface portion of the protective film layer. As can be seen, the adhesive (5) is not in direct contact with the ionomer membrane (1). Contamination of the ionomer membrane by adhesive components is avoided.

Figure 3:
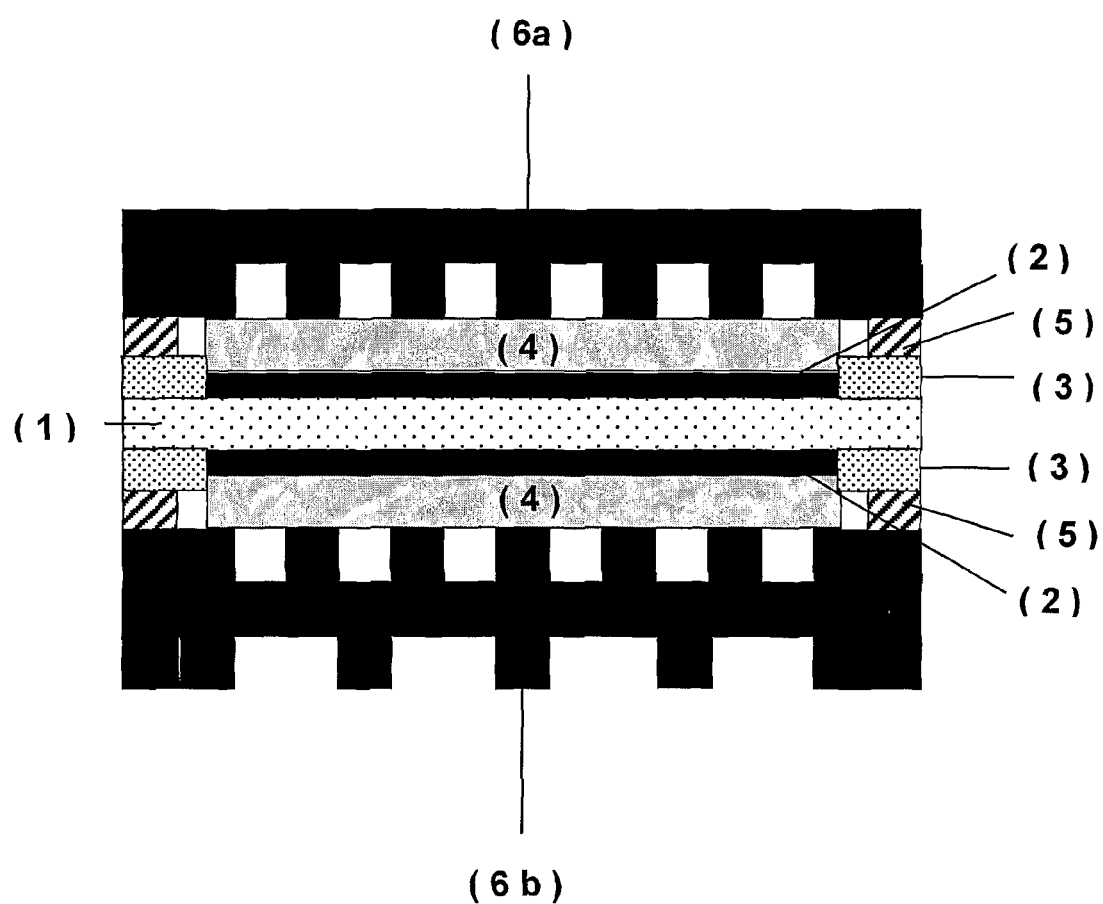
FIG. 3 a cross-section of an alternative version of the second embodiment of the invention

FIG. 3 demonstrates an alternative version of the second embodiment of the invention and depicts a cross-section of a multi-layer membrane electrode assembly (ML-MEA) consisting of nine layers, manufactured according to the "CCB-technology". Again, a frame of protective film layer (3) is attached on either side to the passive area of a membrane (1). Two gas diffusion layers (4), each of which comprise electrode layers (2) on the side facing to the membrane are hot-pressed onto the membrane (1) containing the attached protective film layers (3). However, hot-pressing is performed in such a way that the protective film layers (3) do not overlap with the electrode layers (2). A 7-layer MEA comprising the components (1)-(4) is obtained. Again, two bipolar plates (6a, 6b) are bonded to either side of the MEA by use of a gas-tight, electrically insulating adhesive material (5). The adhesive (5) is in direct contact with the bipolar plate and with the protective film layer. It is not in direct contact with the ionomer membrane (1), thus contamination of the membrane by adhesive components is avoided.

EXAMPLES

The following examples describe the scope of the invention in more detail. These examples are presented to aid in an understanding of the present invention and are not intended to, and should not be construed to, limit the invention in any way. Manufacture of the 7-layer MEAs and 3-layer CCMs used as starting components in the following examples are described in the co-pending patent applications EP 1 403 949 A1 and DE 103 31 836.4, which are hereby incorporated by reference.

Example 1

A 7-layer MEA comprising a CCM, two laminated protective film layers and two gas diffusion substrates (assembly as described in co-pending patent application EP 1 403 949 A1) is used as starting material. The dimensions of the GDLs are 7.1 cm×7.1 cm, the dimensions of the peripheral rim of protective film layers laminated to both sides of the CCM are 10.2 cm×10.2 cm. The ionomer membrane is Nafion® 112 with a thickness of 50 microns, the thickness of a protective film layer (polyurethane-based film, Walopur 4201 AU, supplied by Epurex, Germany) is 50 microns, thus the total thickness of the peripheral rim comprising two protective film layers and the membrane is 150 microns. The protective film layers are overlapping the electrode layers in a small region. The thickness of the active area of the 7-layer MEA is 650 microns.

Two graphite-composite bipolar plates with machined channel structures for reactive gas flow were provided. The outer dimensions of the bipolar plates are 10.2 cm×10.2 cm, the size of the active plate area is 7.1 cm×7.1 cm.

A two-component, polyurethane-based adhesive is used for assembling the 9-layer MEA. Macrocast CR 5125 (component A) and Macrocast CR 4110 (component B; both supplied by Henkel KGBA, Düsseldorf) are weighed in a ratio of 57/43 into a plastic beaker, mixed with a spatula and subsequently filled into cartridges of 3 ccm volume. The pot life of the two-component adhesive is 30 minutes at room temperature (23° C.). By use of an air pressurized dispensing device (Model 1000 XLE, GLT Company, Pforzheim), the adhesive is applied in a string form to both bipolar plates. The air pressure applied to the cartridge is adjusted to 1.0-1.5 bar, depending of the amount of adhesive required.

The string of adhesive is deposited around the active area and the openings of the bipolar plates in such a way, that the adhesive is tightly connecting the components. In order to control the adhesive gap and the adhesive layer thickness at a constant value, two angular pieces of PTFE foil (thickness 250 microns) were placed in the edge areas of the bipolar plate in a way that they do not contact the adhesive deposit.

Subsequently, while the adhesive is still wet, the 7-layer MEA is positioned on to the first bipolar plate in a way, that the peripheral protective film layer is in direct contact with the adhesive deposit and the MEA is perfectly matching the dimensions of the bipolar plate underneath.

In the following steps, two angular pieces of PTFE foil are placed again in the edge area of the 7-layer MEA and finally the second bipolar plate is positioned with its adhesive deposits directed towards the protective film layer accurately on top of the the 7-layer MEA.

This 9-layer assembly is compressed with a force of 5 kgs (=0.05 kg/cm$^2$) for about 48 hours at room temperature (23° C.) to cure the adhesive bonds.

After curing, the components are firmly bonded together forming a 9-layer MEA according to FIG. 1. The angular pieces are removed and the MEA is mounted between two collector plates and two end plates into a PEM single cell. When operated under hydrogen/air conditions at 75° C. and 1.5 bar pressure, the single cell reveals very good long term performance (cell voltage of 700+−10 mV@500 mA/cm$^2$ for 500 hours operating time).

Example 2

For the manufacture of a 7-layer MEA, two catalyst-coated backings (CCBs with a loading of 0.25 mg Pt/cm$^2$, dimensions 7.1 cm×7.1 cm) are manufactured by conventional methods. An ionomer membrane sheet (Nafion 112®, DuPont) with outer dimensions of 10.2×10.2 cm is prepared. Two protective film layers, consisting of polyurethane Platilon U073 (supplied by Epurex Co., Walsrode, Germany) with outer dimensions of 10.2×10.2 cm and inner cut-out dimensions of 7.0×7.0 are placed on both sides of the ionomer membrane sheet. The two catalyst-coated backings (CCBs) are placed on the frontside and on the backside of this assembly. The assembly is pressed at 150° C. and a pressure of 150 N/cm$^2$. After lamination, a 7-layer MEA is obtained with a peripheral rim of about 1.5 cm width around the active area. A small portion of the protection film layer is overlapping and penetrating the active electrode area of the MEA, thus forming a barrier layer.

Two bipolar plates with the same dimensions as described in example 1 are provided. A two-component, polyurethane-based adhesive is used for assembling the 9-layer MEA. Macrocast CR 5125 (component A) and Macrocast CR 4110 (component B; both supplied by Henkel KGaA, Dutsseldorf) are weighed in a ratio of 57/43 into a plastic beaker, mixed with a spatula and subsequently filled into cartridges of 3 ccm volume. The pot life of the 2-component adhesive is 15 to 30 minutes at room temperature (23° C.). Further assembly of the MEA is conducted as described in example 1.

After curing of the adhesive, the components are tightly bonded together forming a 9-layer MEA according to FIG. 2. When operated under hydrogen/air conditions at 75° C. and 1.5 bar pressure, the 9-layer MEA reveals very good long term performance.

Example 3

For the manufacture of a 7-layer MEA, two catalyst-coated backings (CCBs with a loading of 0.25 mg Pt/cm$^2$, dimensions 7.1 cm×7.1 cm) are manufactured by conventional methods. An ionomer membrane sheet (Nafion 112®, DuPont) with outer dimensions of 10.2×10.2 cm is prepared. Two protective film layers, consisting of polyurethane Platilon U073 (supplied by Epurex Co., Walsrode, Germany) with outer dimensions of 10.2×10.2 cm and inner cut-out dimensions of 7.1×7.1 are placed on both sides of the ionomer membrane sheet. The two catalyst-coated backings (CCBs) are placed on the frontside and on the backside of this assembly. The assembly is pressed at 150° C. and a pressure of 150 N/cm². After lamination, a 7-layer MEA is obtained with a peripheral rim of about 1.5 cm width around the active area.

Two bipolar plates with the same dimensions as described in Example 1 are provided. A two-component, polyurethane-based adhesive is used for assembling the 9-layer MEA. Macrocast CR 5125 (component A) and Macrocast CR 4110 (component B; both supplied by Henkel KGaA, Düsseldorf) are weighed in a ratio of 57/43 into a plastic beaker, mixed with a spatula and subsequently filled into cartridges of 3 ccm volume. The pot life of the 2-component adhesive is 15 to 30 minutes at room temperature (23° C.). Further assembly of the MEA is conducted as described in example 1.

After curing of the adhesive, the components are tightly bonded together forming a 9-layer MEA according to FIG. 3. When operated under hydrogen/air conditions at 75° C. and 1.5 bar pressure, the 9-layer MEA reveals very good long term performance.

Example 4

For the manufacture of a 7-layer MEA, two catalyst-coated backings (CCBs with a loading of 0.25 mg Pt/cm², dimensions 7.1 cm×7.1 cm) are prepared by conventional methods. The CCBs are centered on the front and the back side of an ionomer membrane sheet (Nafion 112®, DuPont) with outer dimensions of 10.2×10.2 cm. The assembly is pressed at 150° C. and a pressure of 150 N/cm². Then, two protective film layers, consisting of polyurethane Platilon U 073 (supplied by Epurex Co., Walsrode, Germany) with outer dimensions of 10.2×10.2 cm and inner cut-out dimensions of 7.0×7.0 are placed around the active area on either side of the MEA. The protective film layers are laminated to the assembly at a pressure of 27 bar at 145° C. for a period of 2 minutes. After lamination, a 7-layer MEA is obtained with a peripheral rim of about 1.5 cm width around the active area. It should be noted that a small portion of the protective film layer is overlapping with the CCBs and penetrating the active electrode area of the MEA, thus forming a barrier layer for any contaminants leached out of the adhesive materials.

Two bipolar plates with the same dimensions as described in Example 1 are provided. A two-component, polyurethane-based adhesive is used for assembling the 9-layer MEA. Macrocast CR 5125 (component A) and Macrocast CR 4110 (component B; both supplied by Henkel KGBA, Düsseldorf) are weighed in a ratio of 57/43 into a plastic beaker, mixed with a spatula and subsequently filled into cartridges of 3 ccm volume. The pot life of the 2-component adhesive is 15 to 30 minutes at room temperature (23° C.). Further assembly of the MEA is conducted as described in Example 1.

After curing of the adhesive, the components are tightly bonded together forming a 9-layer MEA. When operated under hydrogen/air conditions at 75° C. and 1.5 bar pressure, the 9-layer MEA reveals very good long term performance (cell voltage of 690+−10 mV at 500 mA/cm² for 500 hours operating time).

Example 5

A 9-layer MEA is manufactured as outlined in Example 1, however, the control of adhesive layer thickness is achieved by a two-stage application of the adhesive. In the first stage, the urethane adhesive is applied to the bipolar plates and cured at room temperature for 48 hours in such a way that the thickness of the cured adhesive layer is controlled to 180 to 220 microns. In the second step, additional fresh adhesive is added to the cured adhesive deposits and the 5-layer MEA is centered in the wet deposits. The assembly is cured as described in the examples 1 and 2. The layer thickness is controlled to about 250 microns without applying the angular pieces of PTFE foil in the edge areas of the bipolar plates. Thus, the assembly process for the 9-layer MEA is less complicated and less time-consuming.

What is claimed is:

1. Multi-layer membrane-electrode-assembly for use in electrochemical cells comprising:
   a first electrically conductive bipolar plate;
   a second electrically conductive bipolar plate; and
   a membrane-electrode-assembly positioned between the first and the second bipolar plates, comprising an ionomer membrane with a front side and a back side, two electrode layers, two protective film layers and two gas diffusion layers, wherein one electrode layer, one protection film layer and one gas diffusion layer are proximate to the front side and the other electrode layer, protection film layer and gas diffusion layer are proximate to the back side of the ionomer membrane, and
   wherein the first bipolar plate, the second bipolar plate and the membrane electrode-assembly are bonded together by means of an adhesive material, the adhesive material being in direct contact with the protective film layers and the bipolar plates and not in direct contact with the ionomer membrane and wherein a frame of each protective film layer is attached to either side of the ionomer membrane in such a way that each protective film layer overlaps a region of each electrode layer and is in direct contact with the membrane and one of the gas diffusion layers and together the protective film layers act as barrier layers to prevent contamination of the ionomer membrane and the electrode layers by components of the adhesive material.

2. Multi-layer membrane-electrode-assembly according to claim 1, wherein the adhesive material comprises an electrically insulating polyurethane system.

3. Multi-layer membrane-electrode-assembly according to claim 1, wherein the protective film layers comprise a polytetrafluoroethylene, PVDF, a polyethylene, a polypropylene, a polyester, a polyamide, a co-polyamide, a polyamide elastomer, a polyimide, a polyurethane, a polyurethane elastomer, a silicone, a silicon rubber, a silicon based elastomer or mixtures or composites thereof.

4. Multi-layer membrane-electrode-assembly according to claim 1, wherein the protective film layers comprise a polyurethane or polyurethane elastomer system.

5. Multi-layer membrane-electrode-assembly according to claim 1, wherein the adhesive material after curing has a layer thickness in the range of 100 to 500 microns.

6. Multi-layer membrane-electrode-assembly according to claim 1, wherein the adhesive material after curing has a layer thickness in the range of 100 to 250 microns.

7. Multi-layer membrane-electrode-assembly according to claim 1, wherein the first electrically conductive bipolar plate and the second electrically conductive bipolar plate are made of graphite, graphitized carbon, graphite composites, metals or metal composite materials.

8. Multi-layer membrane-electrode-assembly according to claim 1, wherein the ionomer membrane comprises a perfluorinated sulfonic acid polymer, an acid-doped polybenzimidazole, an acid-group-modified polyetherketone, an ionically conductive organic/inorganic material or a composite reinforced material.

9. Multi-layer membrane-electrode-assembly according to claim 1, wherein the protective film layers penetrate the electrode layers.

10. Multi-layer membrane-electrode-assembly according to claim 1, wherein the region of the electrode layer overlapped by the protective film layer is in the range of 3% to 10% of the total active area.

* * * * *